(12) United States Patent
Lednicky et al.

(10) Patent No.: US 7,481,459 B2
(45) Date of Patent: Jan. 27, 2009

(54) SHAFT FOR A MOTOR VEHICLE STEERING COLUMN AND ASSOCIATED ASSEMBLY PROCESS

(75) Inventors: Karol Lednicky, Stuttgart (DE); Thorsten Meyer, Aidlingen (DE); Olaf Sättler, Asendorf (DE); Björn Spangemacher, Sindelfingen (DE)

(73) Assignee: Daimler AG, Stuttgart (DE)

( * ) Notice: Subject to any disclaimer, the term of this patent is extended or adjusted under 35 U.S.C. 154(b) by 397 days.

(21) Appl. No.: 11/352,537

(22) Filed: Feb. 13, 2006

(65) Prior Publication Data

US 2006/0186659 A1 Aug. 24, 2006

(30) Foreign Application Priority Data

Feb. 11, 2005 (DE) .................. 10 2005 006 251

(51) Int. Cl.
*B62D 1/16* (2006.01)
(52) U.S. Cl. .................. 280/779; 464/26; 74/492
(58) Field of Classification Search .................. 280/779, 280/771, 775; 74/492, 493; 29/464, 468; 464/26, 162; 92/130 C
See application file for complete search history.

(56) References Cited

U.S. PATENT DOCUMENTS

| 4,337,967 | A | * | 7/1982 | Yoshida et al. | ............... 280/777 |
| 5,106,224 | A | * | 4/1992 | van Gelderen | ............. 403/315 |
| 5,242,195 | A | * | 9/1993 | Wendling | .................... 280/777 |
| 5,332,260 | A | * | 7/1994 | Heinrichs et al. | ........... 280/775 |
| 5,358,353 | A | * | 10/1994 | Schremmer et al. | ......... 403/196 |
| 5,449,199 | A | * | 9/1995 | Heinrichs et al. | ........... 280/775 |
| 6,279,952 | B1 | * | 8/2001 | Van Wynsberghe et al. | . 280/777 |
| 6,354,626 | B1 | * | 3/2002 | Cartwright | .................... 280/777 |
| 6,830,267 | B2 | * | 12/2004 | Budaker et al. | ............. 280/775 |
| 2004/0185942 | A1 | * | 9/2004 | Stimpfl et al. | ............... 464/106 |

FOREIGN PATENT DOCUMENTS

| DE | 42 08 497 C1 | 7/1993 |
| DE | 690 11 168 T2 | 8/1994 |
| DE | 102 58 028 B3 | 1/2004 |

* cited by examiner

*Primary Examiner*—Christopher Ellis
*Assistant Examiner*—Joseph Rocca
(74) *Attorney, Agent, or Firm*—Patent Central LLC; Stephan A. Pendorf

(57) ABSTRACT

The present invention concerns a steering shaft (4) of a steering column (1) and (4) for a motor vehicle steering assembly (2), wherein the steering shaft (4) includes a cylinder body (11) and a piston rod body (12) inserted telescopically therein, and on one end is connectible with a steering wheel (6) and at the other is connectible via a steering coupling (5) with a steering gear (7). The assembly of the steering shaft (4) can be simplified thereby, that the steering shaft (4) includes at least one (1) pneumatic connection (13), which communicates with a cylinder space (14), which is provided in the cylinder body (11) and which cylinder space is axially bordered from the piston rod body (12), in such a manner, that pressure actuation of the cylinder space (14) drives the piston rod body (12) to extend from the cylinder body (11).

9 Claims, 2 Drawing Sheets

SHAFT FOR A MOTOR VEHICLE STEERING COLUMN AND ASSOCIATED ASSEMBLY PROCESS

CROSS REFERENCE TO RELATED APPLICATION

This application claims the benefit of German Application No. DE 10 2005 006 251.2 filed Feb. 11, 2005.

BACKGROUND OF THE INVENTION

1. Field of the Invention

The present invention is concerned with a shaft of a steering column for steering a motor vehicle. The invention further concerns a process for assembling a steering shaft of this type onto a motor vehicle.

2. Description of the Related Art

Conventionally, a steering shaft includes a cylindrical body and a therein telescopically introduced piston rod body. In such a steering shaft on the one end is connectable with the steering wheel and the other end is connectable, via a steering coupling, with a steering gear. The assembly of the steering shaft occurs conventionally in such manner that first a steering gear with steering coupling is mounted on a vehicle, on the engine compartment side of a firewall which separates the engine compartment from a passenger compartment. Conventionally, the installation of the steering gear in the engine compartment occurs simultaneously with the installation of the internal combustion engine. On the driver side of the firewall there occurs then an installation of the steering shaft in the vehicle, at which time the steering shaft is provided on the vehicle in such a manner that one steering end end, which is intended to be joined to the steering coupling, projects into a steering column opening, which is provided on the firewall. Thereafter a mechanic can grab hold of the said steering shaft end on the engine compartment side and pull it into the engine compartment. Thereby the piston rod body is pulled telescopically out of the cylinder body. Said steering shaft end can then be connected with the steering coupling.

A problem herein is the extreme difficulty in accessing the steering shaft end, since at this stage of the vehicle assembly a number of components and assemblies have already been mounted in the engine compartment, such as for example the internal combustion engine and the exhaust assembly. The obscured access to the steering shaft end, which must be pulled out the steering column opening and into the engine compartment in order that it can be connected with the steering coupling, complicates therewith the assembly of the steering shaft and makes this in particular time intensive.

From applications DE 102 58 028 B3, DE 42 08 497 C1 and DE 69 011 168 T2 various couplings are known, which can be used for connecting the steering coupling with the steering gear.

SUMMARY OF THE INVENTION

The present invention is concerned with the problem of providing a steering shaft of the above described type which however simplifies the assembly of the steering shaft to the motor vehicle.

In accordance with the invention the solution to this problem is set forth in the characterizing part of the independent claims. Advantageous embodiments are the subject of the dependent claims.

The invention is concerned with the general concept of so designing the steering shaft, that the piston rod body can be extended out of the cylinder body by application of pressure in a cylinder space which within the cylinder body is bordered by the piston rod body. With a steering shaft of this type it is thus not necessary to reach by hand into the engine compartment to connect the provided shaft end to the steering coupling, but rather, by a appropriate pressure actuation of the cylinder space, this shaft end can be extended into the engine compartment without it being necessary to have any contact with the mentioned shaft end. An accessibility to the shaft end for assembly is thus unnecessary. Thereby the assembly of the steering shaft on the motor vehicle can be substantially simplified.

For achieving the invention the steering shaft is equipped with at least one pneumatic connection, which is in communication with the mentioned cylinder space. An appropriate pressure supply, for example a compressed air supply, which is usually available in the vicinity of an assembly line, can easily be connected to this pneumatic connection. In this manner the extending of the cylinder body and therewith the insertion of the concerned steering shaft end in the engine compartment can be remotely controlled.

The steering shaft can, in accordance with a preferred embodiment, be equipped with an abutment or end-stop, which limits the extension of the piston rod body out of the cylinder body to a maximal extension length. In this manner an actuator problem with the pressure actuator cannot lead to the result that the piston rod body is pushed completely out of the cylinder body.

The ease of assembly of the steering shaft can also be improved thereby, that the steering shaft and the steering coupling are oriented relative to each other prior to the pressure actuation of the cylinder space such that the said steering shaft end, upon the pressure actuation of the cylinder space, automatically extends into the steering coupling. In this manner the insertion of the steering shaft end into the steering coupling is also easily possible even in the case of reduced accessibility, since the respective mechanic need touch either the steering coupling or the steering shaft end.

In particular, the assembly can be substantially automated thereby, in that for example the orientation of steering shaft and steering coupling as well as the subsequent pressure actuation of the cylinder space can be automated or as the case may be can be carried out automatically.

Additional important characteristics and advantages of the invention can be seen from the dependent claims, from the figures and from the associated description of the figures with reference to the figures.

It is understood that the above-discussed characteristics and the below yet to be discussed characteristics are not limited to the respectively recited combinations, but rather can be extended to other combinations or can be employed independently, without leaving the framework of the present invention.

Preferred embodiments of the invention are shown in the figures and are explained in greater detail in the following description, wherein the same reference numbers refer to the same or functionally equivalent components.

BRIEF DESCRIPTION OF THE DRAWINGS

There is shown, respectively schematically.

DETAILED DESCRIPTION OF THE INVENTION

Figure 1:
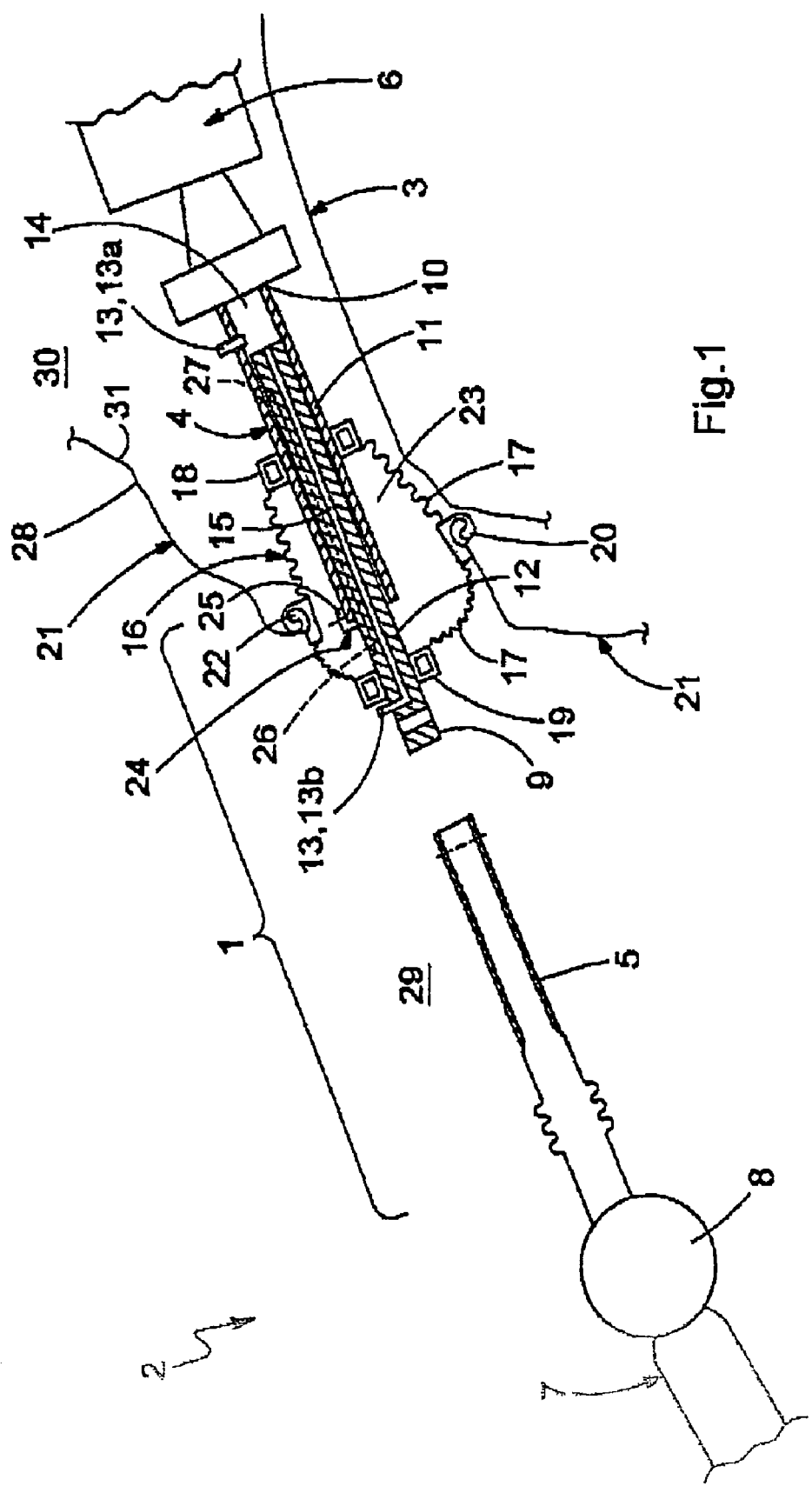
FIG. 1. a substantially simplified, partially sectional view of a steering column prior to connecting the steering shaft with the steering coupling, and FIG. 2. a view according to that of FIG. 1, however subsequent to the connecting of the steering shaft with the steering coupling.
Figure 2:
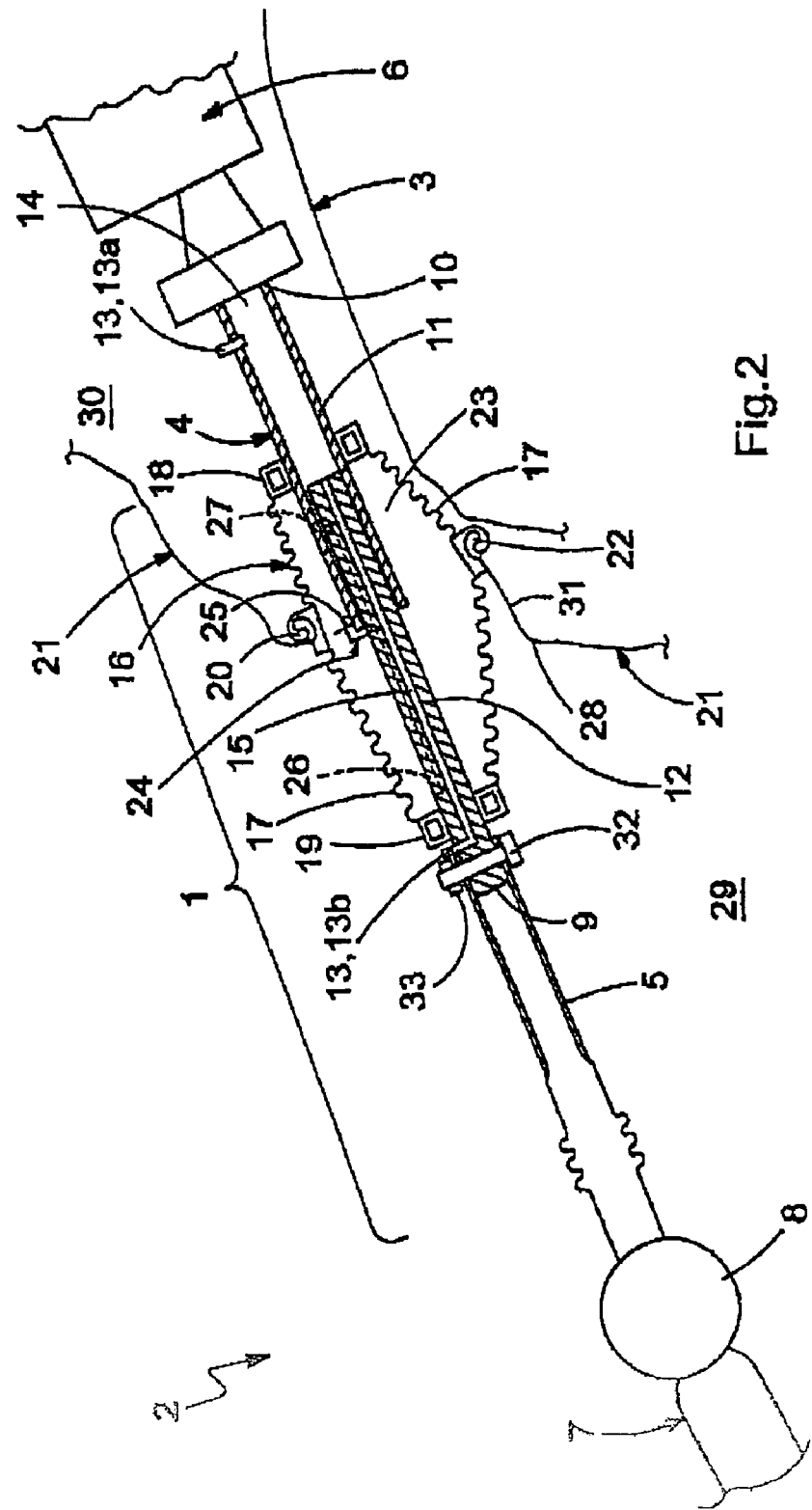

According to FIGS. 1 and 2 the steering column 1 includes a steering unit 2 of an only partially shown motor vehicle 3, a steering shaft 4, and a steering coupling 5. The steering column 1 serves for connection a steering wheel 6 with a steering gear 7. For this, the steering column 1 is connected on the one end with the steering wheel 6 and on the other end, via a linkage coupling 8, with the steering gear 7. In the assembled condition of the steering column 1 the steering shaft end 9 of the steering shaft 4 is connected with the steering coupling 5. On its other end 10 the steering shaft 4 is connected with the steering wheel 6. Further, the steering coupling 5 is connected via a universal joint or linkage coupling 8 with the steering gear 7.

The steering shaft 4 includes a cylinder body 11 and a piston rod body 12, which is telescopically inserted in the cylinder body 11. In the preferred embodiment of the invention shown here the cylinder body 11 is connected with the steering wheel 6, while the piston rod body 12 is connectible or, as the case may be, is connected with the steering coupling 5. In accordance therewith the steering coupling 5 associated steering shaft 9 is, in the present case, provided on the piston rod body 12. Basically, however, a different embodiment is also possible, in which the cylinder body 11 is adapted for connecting to the steering coupling 5, while the piston rod body 12 is connectible with the steering wheel 5. In one such embodiment the steering coupling 5 associated steering shaft 9 would then be on the cylinder body 11.

In accordance with the invention the steering shaft 4 is equipped with at least one pneumatic connection 13. In the present case two different pneumatic connections 13a and 13b are shown, of which the positions are shown purely by way of example and could be realized cumulatively or alternatively. The respective pneumatic connection fitting 13 communicates with a cylinder space 14. This cylinder space 14 is provided on the inside of the cylinder body 11 and there is accessibly bordered by the piston rod body 12.

The one pneumatic fixture 13a is here shown, by way of example, provided directly on the cylinder 11, namely such that it upon maximal retraction of the piston rod body 12 it communicates without interference with the cylinder space 14. The other pneumatic hose 13b is provided for example on the piston rod body 12 and is thereby preferably so designed, that when the piston rod body 12 is completely retracted into the cylinder body 11 it remains outside of the cylinder body 11. This means, that this pneumatic connection 13b is provided in one of the more extreme end areas of steering shaft ends 19 of the piston rod body 12. At least then, when the pneumatic connection fitting 13b is provided on the piston rod body 12, the piston rod body 12 contains a channel 15, which connects the mentioned pneumatic connection fitting 13b with a cylinder space 14.

The steering shaft 4 is, besides this, equipped with a bellows-like sleeve or cuff 16, which includes a bellows body 17. The bellows body 17 is secured with a first flange 18 at the cylinder body 11. With a second flange 19 the bellows body 17 is connected to the piston rod body 12. Further, the sleeve 16 exhibits a third flange 20, which is provided between the two other flanges 18, 19 and together with the bellows body 17 can be connected to a (fire) wall 21 of the vehicle. In the here mounted condition of the sleeve 16 the third flange 20 is secured to a collar 22, which includes steering column opening 23 formed on the fire wall 21, and in particular is here buttoned or snap-fit in.

Besides this, the steering shaft 4 is here provided with an abutment or end-stop 24, which is so designed, that it limits extending of the piston rod body 12 out of the cylinder head 11 to a maximal extension length. The design of the abutment 24 is here, purely by way of example, shown with the aid of a abutment element 25, which is secured to the cylinder body 11 and engages in an elongate groove 26, which is formed on the outside of the piston rod body 12. Since this longitudinal groove 26 exhibits a groove end 27 on the side distant from the steering shaft end 9, the abutment element 25 comes to contact or lie against this upon reaching the maximal extension length at this groove end 27.

The inventive steering shaft 4 can be installed in a vehicle 3 as follows:

First, the steering gear 7 with the steering coupling 5 is provided in the engine compartment 29 of the vehicle 3 on the engine compartment side 28 of the firewall 21. The firewall 21 separates thereby the mentioned engine compartment 29 from a passenger compartment 30 of the vehicle 3. Conventionally the steering gear 7 is installed in the engine compartment 29 together with an internal combustion engine and further components. For example, the internal combustion engine and steering gear 7 are mounted on a common integral carrier (not shown).

Further, the steering shaft 4 is provided on the passenger compartment side 31 of the firewall 21 in the driver space 30 in the vehicle 3. For this, the steering shaft 4 is located according to FIG. 1 in a retracted condition, that is, the piston rod body 12 is substantially retracted into the cylinder body 11. The arrangement and the positioning of the steering shaft 4 in the driver space 3 occurs thereby such that the steering shaft end 9, provided for connecting to the steering coupling 5, extends or penetrates into the steering column opening 23.

Subsequently the pneumatic pressure in the cylinder space 14 can be increased via the pneumatic connection 13, that is, via a pneumatic connection 13a or via a pneumatic connection 13b. For this a corresponding pressure supply, such as for example a compressed air line, is connected to the respective pneumatic connection 13. For this there is suited, in particular, a compressed air gun, which is conventionally available in an assembly line. The compressed air acting upon the cylinder space 14 leads thereto that the piston rod body 12 is driven out of the cylinder body 11. This means here, that the steering shaft end 9 is extended through the steering column opening 23 into the engine compartment 29. It is notable herein that for the introduction of the steering shaft end 9 into the engine compartment 29 the piston rod body 12 need not be manually actuated or touched by hand. Insofar, a good manual accessibility of the steering shaft end 9 for extending it from the piston rod body 12 is not necessary. Further, an extension of the piston rod body 12 via the pressure supply can be controlled quasi remote-controlled, which supplementally simplifies the process.

After the introduction of the steering shaft end 9 into the engine 29 it can, as shown in FIG. 2, be connected in particularly simple manner with the steering coupling 5. The connecting is here achieved by means of a screw 32, which cooperates therefore with a nut 33. The steering shaft 9, for the transmission of torque, can be designed in conventional manner as having two flat surfaces, while the steering coupling 5 could accordingly be complimentary designed.

According to a preferred embodiment, an orientation of the steering coupling 5 relative to the steering shaft 4 occurs prior to the pressure actuation of the cylinder space 14, in such a manner, that the steering coupling 5 and the piston rod body 12 align coaxial to each other. Thereby it is achieved, that during the subsequent pressure actuation of the cylinder space 14 the steering shaft end 9 engages the steering coupling 5 and in certain cases following a correction of the rotational position can be introduced thereinto. In this manner the assembly process can be substantially automated. In particular the orientation of the steering shaft 4 and steering coupling 5 as well as the subsequent pressure actuation of the cylinder space 14 can be carried out completely automatically.

The invention claimed is:

1. A steering shaft for a steering column (1) for a motor vehicle steering (2), comprising:
   - a cylinder body (11) having a cylinder space (14) within the cylinder body (11);
   - a piston rod body (12) being telescopically inserted in the cylinder body (11) and axially bordered by the cylinder space (14);
   - the steering shaft (4) being connectible at one end with a steering wheel (6) and on the other end with a steering gear (7);
   - a pneumatic connector (13) for pressurizing the cylinder space (14), wherein pressure actuation of the cylinder space (14) extends the piston rod body (12) away from the cylinder body (11) and towards the steering gear (7).

2. A steering shaft according to claim 1, wherein a pneumatic connection (13*a*) is provided on the cylinder body (11).

3. A steering shaft according to claim 1, wherein a pneumatic connection (13*b*) is provided on the piston rod body (12) in a end area remaining completely outside of the cylinder body (11) when the piston rod body (12) is completely retracted into the cylinder body (11), wherein the piston rod body (12) includes a channel (15) through which the pneumatic connection (13*b*) communicates with the cylinder space (14).

4. A steering shaft according to claim 1, wherein an abutment (24) is provided which limits the extension of the piston rod body (12) out of the cylinder body (11) to a maximal extension length.

5. A process for assembling a steering shaft (14) of a steering unit (2) in a motor vehicle (3) having an engine compartment (29) and a passenger compartment (30) separated by a firewall, said process comprising:
   - providing a steering gear (7) with a steering coupling (5) on the engine compartment side (28) of the firewall (21) on the vehicle (3);
   - providing on the passenger compartment side of the firewall (21) a steering shaft (4), including a cylinder body (11) and a therein telescopically inserted piston rod body (12), with piston rod body (12) retracted into the cylinder body (11) such that a steering shaft (9) provided for connecting to the steering coupling (5) extends into a steering column opening (23) provided in the firewall (21); and
   - actuating a cylinder space (14) in the steering column (4) with pressure via a pneumatic connection (13), which cylinder space (14) is axially bordered by the piston rod body (12) provided in the cylinder body (11), in such a manner, that the piston rod body (12) is extended from the cylinder body (11), wereupon said steering shaft end (9) passes through the steering column opening (23) and into the engine compartment (29), whereby the steering shaft (9) introduced into the engine compartment (29) is connected with the steering coupling (5).

6. A process according to claim 5, wherein the steering shaft (9) is extended by the pressure actuation of the cylinder space (14) until it passes into the steering coupling (5).

7. A process according to claim 5, wherein the steering shaft (4) and the steering coupling (5) are oriented relative to each other prior to the pressure actuation of the cylinder space (14) in such a manner that said steering shaft (9) upon the pressure actuation of the cylinder space (14) extends automatically until it is in the steering coupling (5).

8. A process according to claim 7, wherein the orientation of the steering shaft (4) and steering coupling (5) and the pressure actuation of the cylinder space (14) are carried out automatically.

9. A steering shaft for a steering column (1) for a motor vehicle steering (2), said steering shaft (4) including:
   - a cylinder body (11) and a therein telescopically inserted piston rod body (12), said steering shaft (4) connectible at one end with a steering wheel (6) and on the other end via a steering coupling (5) with a steering gear (7):
   - wherein the steering shaft (4) includes at least one pneumatic connector (13), which communicates with a cylinder space (14) within the cylinder body (11), which cylinder space is axially bordered by the piston rod body (12), in such a manner, that pressure actuation of the cylinder space (14) drives the piston rod body (12) to extend from the cylinder body (11); and
   - wherein a pneumatic connection (13*b*) is provided on the piston rod body (12) in a end area remaining completely outside of the cylinder body (11) when the piston rod body (12) is completely retracted into the cylinder body (11), wherein the piston rod body (12) includes a channel (15) through which the pneumatic connection (13*b*) communicates with the cylinder space (14).

\* \* \* \* \*